3 # 2,989,544
PRODUCTION OF PHTHALIC ANHYDRIDE FROM LOW SULFUR NAPHTHALENE

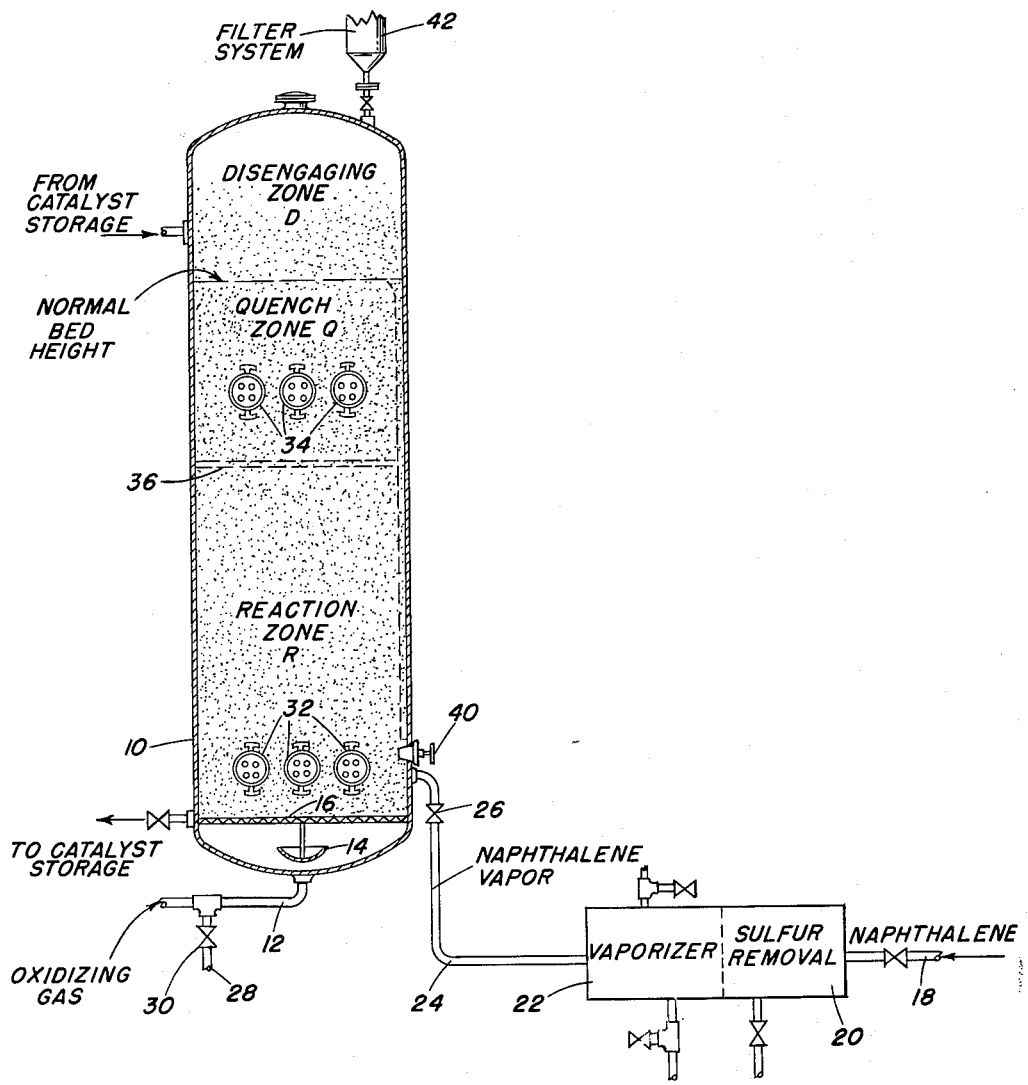

Kenneth W. Saunders, Darien, and James E. Longfield, Stamford, Conn., and Robert C. Ryder, Library, Pa., assignors to American Cyanamid Company, New York, N.Y., a corporation of Maine
Filed Feb. 7, 1956, Ser. No. 563,887
5 Claims. (Cl. 260—346.4)

The present invention relates to improved processes in fluidized catalytic systems for the oxidation of aromatic hydrocarbons to desired intermediate oxidation products and more particularly is concerned with such fluidized catalytic systems employing a combined process of pretreating the aromatic mono-, bi- and tricyclic hydrocarbons whereby greater yields of desired intermediate oxidation products are made available, lower optimum oxidation temperatures may be employed and more stable catalyst properties are obtained.

The exothermic oxidation of aromatic hydrocarbons to desired intermediate oxidation products is well known in industry and is carried out normally in fixed catalytic bed systems employing a standard vanadium oxide oxidation catalyst. Specific examples of such oxidations include reactions involving the conversion of naphthalene to phthalic anhydride, anthracene to anthraquinone, naphthalene to napthoquinone, xylene to phthalic anhydride or tolualdehyde, benzene to maleic anhydride, etc. These fixed bed systems have been found generally satisfactory in the past but it has been felt that such an oxidation could more advantageously be carried out in a fluidized system. The difficulties and problems involved, however, have been great and the efforts which have been directed at the application of the fluidized techniques to such exothermic oxidations have been only moderately successful. One of the greatest single drawbacks has been the decreased efficiency of the oxidation process after the operation has been in use for only a relatively short period of time. For example, it has been found that initial yields of 105–107 pounds or more of phthalic anhydride per 100 pounds of naphthalene feed soon dwindle to only 99 pounds or less in a matter of less than 25 days. Additionally, it has been found that higher and higher operating temperatures are required, as time goes by, in order to obtain optimum yields. Such higher temperatures are more wearing on the equipment, more destructive to the catalyst itself and, of course, are less favorable to the stability of the desired oxidation products. For example, in the case of the oxidation of naphthalene to phthalic anhydride, initial optimum oxidation temperatures of about 350° C. have had to be increased to 370° C. or more in a matter of only 8 days to maintain optimum yields of phthalic anhydride. These higher temperatures not only require more durable equipment or the life expectancy of existing equipment will be decreased, along with increased catalyst decomposition and poorer product selectivity with such higher temperatures.

It has been found that, if the aromatic hydrocarbon feed to such oxidation reactions is given a pretreatment and the sulfur-containing compounds are removed, initial yields are maintained at their original high levels, operating temperatures do not have to be increased to obtain optimum oxidation conditions, the useful life of the catalyst is prolonged and may be used for longer periods without requiring regeneration, equipment life is not decreased and product selectivity is enhanced.

It is, of course, to be realized that the greater the concentration of the sulfur-containing compounds there is in the aromatic hydrocarbon feed, then the greater are the improvements noted. Contrariwise, the lower the concentration of sulfur-containing compounds, then the lesser are the improvements noted.

The precise reasons for such improvements are not completely and thoroughly understood but it is believed that one of the factors lies in the actual composition of the fluidized catalyst itself as well as the nature and the mechanism of the fluidized catalytic reaction. The catalyst is normally the standard vanadium oxide-silica-potassium pyrosulfate type ($V_2O_5$—$SiO_2$—$K_2S_2O_7$), such as described in greater detail in U.S. Patent 2,698,330, issued December 28, 1954, to Fugate and Tribit. Such a catalyst usually comprises from about 40% to about 75% by weight of a calcined gel of silica, impregnated substantially uniformly with from about 20% to about 50% and preferably from about 46% to about 47% of a potassium sulfate, calculated as potassium pyrosulfate and based on the calcined weight of the catalyst, and from about 3% to about 25%, and preferably from about 8% to about 15%, by weight of vanadium pentoxide in the finished catalyst. Oxides of cerium, iron, zirconium, molybdenum or silver, or mixtures thereof, may be included as promoters in amounts ranging from about 0.05% to about 5%, and preferably from about 0.2 to about 2% by weight.

In these catalysts, the particular molar proportion of $SO_3$ to $K_2O$ in the potassium sulfate is of importance and is normally maintained from about 1.9 to about 2.1 to 1 and preferably at about 2 to 1. In a fluidized system wherein the bed height may range up to as great as 20–25 feet or more as compared to only as little as about 5 feet for a fixed bed installation and wherein the catalyst contact time may range up to as high as 15–20 seconds or more as compared to as short as only about 0.3 second for a fixed bed installation, the sulfur-containing compounds, such as thianaphthene, are presumably oxidized under such different conditions to $SO_2$ which is converted further to $SO_3$ under the existing reaction conditions. Another factor creating the undesirable formation of $SO_3$ is to be noted in the higher temperatures employed in the fixed bed installations wherein the reaction temperatures range from 450 to about 500° C. with a "hot spot" as high as about 530° C. as compared to the 330–370° C. range in the fluidized bed process. This additional $SO_3$ is apparently initially absorbed by the fluid catalyst and such absorption continues up to a certain extent, increasing the molar proportions of $SO_3$ to $K_2O$ to 2.2, 2.3 or even higher in the fluid catalyst. This unbalances the nature and chemical characteristics of the catalyst and less efficient operating conditions are immediately observed. Furthermore, when the catalyst cannot absorb any more $SO_3$, that gas is believed to combine with any available moisture to form sulfuric acid which is destructive and corrosive to the equipment and particularly the vapor cooler. Additionally, the sulfuric acid has been observed to cause an undesirable hydration of the phthalic anhydride to phthalic acid, when such anhydride is the desired oxidation product.

The undesirable sulfur-containing compounds in the naphthalene may be removed by treatment with various materials capable of absorbing or adsorbing such sulfur-containing compounds, following which the naphthalene may be separated by filtration, or distillation procedures. The following examples are set forth to illustrate preferred methods of sulfur-removal but such examples are not to be construed as limitative of the methods capable of use.

Example 1

100 pounds of naphthalene containing 0.39% by weight of sulfur (as thianaphthene primarily) was charged to a 20 gallon, stainless steel, Dowtherm-heated kettle equipped with an agitator. The naphthalene charge was dehydrated for 3 hours at a temperature of about 175° C. in a current of nitrogen. The temperature was then raised to about 212° C. and 0.86 pound of metallic sodium in the form of a 50% dispersion in naphthalene was added with agitation. At the end of 1 hour, the kettle was cooled to about 120° C. and the naphthalene was distilled off at 50 mm. The concentration of sulfur in the distilled naphthalene was determined to be only 0.07% by weight.

*Example 2*

100 pounds of naphthalene containing 0.51% by weight of sulfur was charged to a 20 gallon, stainless steel, Dowtherm-heated kettle equipped with an agitator. The naphthalene charge was dehydrated for 3 hours at a temperature of about 175° C. in a current of nitrogen. The temperature was then raised to about 215–219° C. and 0.86 pound of metallic sodium in the form of a 50% dispersion in naphthalene was added with agitation. At the end of 1 hour, the kettle was heated and the naphthalene was distilled off at atmospheric pressure. The concentration of the sulfur in the distilled naphthalene was determined to be about 0.06% by weight.

*Example 3*

100 pounds of naphthalene containing 0.39% by weight of sulfur (primarily as thianaphthene) was charged to a 20 gallon, stainless steel, Dowtherm-heated kettle equipped with an agitator. The naphthalene charge was dehydrated for 3 hours at a temperature of about 175° C. in a current of nitrogen. Anhydrous aluminum chloride in an amount equivalent to 100% of the theoretical stoichiometric amount required to remove the sulfur (based on 1.55% thianaphthene in the naphthalene) was added and the mixture agitated at a temperature of about 85–90° C. for 1 hour. The aluminum chloride sludge was permitted to settle and the naphthalene was removed in a simple vacuum distillation. The concentration of sulfur in the distilled naphthalene was determined to be about 0.07% by weight.

*Example 4*

The procedures of Example 1 were followed substantially as set forth therein except that a temperature of 218° C. was used and 150% of the theoretically stoichiometrically required metallic sodium level was used. In 15 minutes, the sulfur content was down to 0.05% by weight; in 30 minutes, it was down to 0.04%; and in 45 minutes, it was down to 0.03% by weight.

*Example 5*

The procedures of Example 4 were followed except that 200% of the theoretically stoichiometrically required metallic sodium level was used. In 15 minutes, the sulfur content was down to 0.04%; and in 30 minutes, it was down to 0.004% by weight.

*Example 6*

The procedures of Example 1 were followed substantially as set forth therein except that "Super Filtrol" (a clay-type natural catalytic material containing silica and alumina as its major constituents along with smaller concentrations of oxides of magnesium, calcium and iron) was used in a concentration of about 10 pounds per 100 pounds of naphthalene containing 0.39% by weight of sulfur. The mixture was heated at a temperature of about 218° C. for about 1 hour at which time a distilled sample indicated that the sulfur content was on the order of about 0.04% by weight.

It has been found that the treated aromatic hydrocarbon should contain less than 0.1% by weight of sulfur in order to avoid the objections and difficulties described hereinabove. Within the more commercial aspects of the present invention, however, it is advisable that the aromatic hydrocarbon which is fed to the reactors to be oxidized to the desired intermediate oxidation products by the fluidized techniques should contain not more than from about 0.02 to about 0.06% by weight of sulfur.

It is to be appreciated that the term "desired intermediate oxidation products" does not include the final products of such oxidations, such as water and oxides of carbon, but merely includes the intermediate oxidation products such as phthalic anhydride, tolualdehyde, maleic anhydride, naphthoquinone, anthraquinone, etc.

The invention will be further illustrated by reference to a specific embodiment of a fluidized catalytic system for oxidizing naphthalene to phthalic anhydride. This preferred embodiment is set forth for illustrative purposes and is noted in the figure of the drawing which is not to be construed as limitative of the invention.

Referring to the figure, the numeral 10 represents a vertical converter or reactor which is substantially cylindrical in shape and which, in its simplest form, basically comprises three zones: A reaction zone R, a quench zone Q, and a catalyst disengaging zone D. The reaction zone R and the quench zone Q are designed for the disposition of a mass of finely divided or powdered catalytic material, generally called fluid catalyst, which is maintained in a turbulent state in the dense phase zone by the reactant gases and vapors which are passed upwardly therethrough during the reaction.

An inlet supply pipe 12 is provided for the introduction of an oxidizing gas, such as oxygen or air, into the lower part of the reaction zone R. A diffuser 14 and a distribution grid 16 which may comprise a perforated plate or similar means are employed to provide a more uniform flow of the reaction gas through the catalytic material in the reaction zone R.

The commercial naphthalene, usually approximately 98% and containing from about 0.4 to about 0.7% by weight of sulfur and down to 0.1–0.4% by weight of sulfur in the more refined grades is introduced through inlet pipe 18 into the sulfur removal treatment apparatus 20 and the sulfur content reduced therein. The treated naphthalene containing less than about 0.1% by weight of thianaphthene is then fed to a vaporizer 22 where it is vaporized then fed into reactor inlet pipe 24.

The volatilized or volatilizable materials in gaseous form is introduced into the reaction zone R through the inlet means 24, having thereon a feed rate control device, such as an adjustable valve 26. Any suitable form of inlet means arrangement may be employed but it has been found that a header, or bustle pipe, provided with several evenly spaced injection nipples entering the reaction zone R, preferably above the grid 16 is quite satisfactory. Although the particular embodiment of the invention selected for illustrative purposes discloses separate inlets for the vaporizable materials and the reaction gas, it is to be appreciated that all gasiform reactants may enter through a common inlet where such an arrangement is preferable.

For example, a separate inlet 28 equipped with an individual control device, such as a valve 30, may be provided for the admission of the vaporizable organic materials whereby the oxidizing gas passing through the inlet 12 is mixed with the organic materials and the mixture enters the reactor 10 together.

An air compressing system (not shown) may be used to control the pressure and rate of flow of the oxidizing gas. In a similar way, an air heater (not shown) may also be added to preheat the entering gases to any desired temperature range. Similar compressing means and/or heating means may be utilized to control the pressure, rate of flow and temperature of the organic materials, if they are individually fed to the reactor.

A plurality of temperature controlled elements, such as heat exchangers 32, are positioned within the reaction zone R to bring the same within any desired or necessary conversion temperature range. In the specific case of the conversion of naphthalene to phthalic anhydride, it has been found that this range extends from about 320° C. to about 425° C. with the most favorable temperature being in the neighborhood of approximately 350° C., depending upon the particular type of fluidized catalyst being employed for the reaction, which naturally affects the temperature and time of contact of the process.

These heat exchangers 32 are preferably in the form of removable U-tubes which lie in a horizontal plane and effectively maintain the zone at the most favorable operating temperatures. The cooling medium employed may be any desired heat exchanging substance such as water, a salt bath, mercury, "Dowtherm" (a mixture of diphenyl oxide and diphenyl), or the like.

A second plurality of temperature control elements 34, also in the form of a series of removable U-tube heat exchangers, extends in a horizontal plane transversely within the quench zone of the reactor and these heat exchange elements are controlled separately from the first series of heat interchangers 32. These U-tubes effectively control the temperatures existing in the quench zone.

A baffle 36 is positioned in the catalyst bed between the heat exchangers 32 and 34 and assists in the establishing of two temperature ranges in the bed. This baffle is illustrated in the form of a perforated plate, somewhat similar in shape to distribution grid 16. This baffle 36 also provides for a uniform flow of the gas stream upwardly through the quench zone, whereby channeling, bubbling and other undesirable effects are prevented.

In the specific case of the conversion of naphthalene to phthalic anhydride, it has been found that the preferable temperature range in the quench zone extends from about 200° C. to about 300° C., with the most favorable temperature being in the neighborhood of approximately 250° C.

A vertically positioned downcomer circulating or return pipe 38 is provided adjacent the internal surface of the cylindrical reactor to facilitate proper control over the bed level. The rate of return of catalyst from the upper portion to the lower portion of the bed is controlled by means of a valve 40 which may be actuated by pressure, level or density control in the quench zone, the action of which is automatically operable. A filter system 42 is provided in order to hold back any catalyst fines or other particles entrained in the effluent gases, not separated out in the disengaging zone and permit the filtered gases to pass therethrough.

*Example 7*

The following is a description of a commercial procedure for converting naphthalene into phthalic anhydride. The naphthalene containing approximately 1.5% thianaphthene (by weight) is fed into the sulfur removal bath for treatment therein as set forth in Example 1 to extract the sulfur-containing materials therefrom. After passing through the sulfur removal treatment, the naphthalene possessing less than 0.1% sulfur (actually 0.04%) is passed in vapor form to the reactor. Air is fed into the bottom of the reactor at such a rate that the average velocity of air in the reactor, assuming no catalyst, is about 0.2 to about 5 feet per second and preferably from about 1.0 to about 2.0 feet per second. The naphthalene vapor is fed into the catalyst bed in the reaction zone at such a rate that the ratio of naphthalene to air is about 1.0 to 2.0 mol percent and preferably 1.5 mol percent. The temperature of the reaction zone of the catalyst bed is maintained by the heat exchangers at about 320 to 410° C. and preferably about 350° C., depending upon the bed height. The height of the entire catalyst bed comprising a reaction zone and a quench zone is such that the contact time in the reaction zone is about 3–25 seconds and preferably 10–20 seconds for a 20 foot bed. The temperature, contact time and mol percent naphthalene to air were all somewhat interdependent factors and dependent upon the activity of the particular catalyst being used.

The reaction mixture is maintained at a temperature of about 210 to 270° C. and preferably 250° C. by the heat exchanger in the quench zone of the catalyst bed. The quench zone very quickly cools the reaction mixture to a temperature at which there is no further reaction and no condensation in the converter or on the catalyst. The catalyst is separated from the reaction gases in the disengaging zone and in the filters and the phthalic anhydride is recovered in suitable condensers. A yield of 107 pounds of phthalic anhydride per 100 pounds of 98% naphthalene is obtained.

*Example 8*

The effect of sulfur compounds in naphthalene was studied, using a 2-inch fluid unit under the following operating conditions: Temperature—365° C.; bed height—10 ft.; linear velocity—1 ft. per second; contact time—10 seconds; mol percent of naphthalene—1.4; and a naphthalene loading rate of 0.03 gram of naphthalene per gram of catalyst per hour. Using a high sulfur naphthalene (0.74% sulfur), the phthalic anhydride yields dropped by about 10 lbs. per 100 lbs. of naphthalene feed after only 3 days of operation. The $V^{+4}$ was up to 3.7% (over 80% reduction of the vanadium in the catalyst), the naphthoquinone had increased to 4 lbs. per 100 lb. of naphthalene feed, and fluidization of the catalyst was poor. Under the same operating conditions but using low sulfur naphthalene (0.06% sulfur), steady and good operation was maintained continuously for 21½ days. The catalyst used contained 42.6% by weight of silica, 10.2% by weight of vanadium pentoxide, 46.7% of potassium pyrosulfate and 0.3% by weight of silver oxide.

The following table shows in tabular form the results obtained in Example 8:

| | Low Sulfur Naphthalene, 0.06% S | High Sulfur Naphthalene, 0.74% S |
|---|---|---|
| Time of Operation, days | 21.5 | 3 |
| Yield: | | |
| PAA, lbs./100 lbs. Feed | 101 | 100→88 |
| MA, lbs./100 lbs. Feed | 1 | 1.3 |
| NQ, lbs./100 lbs. Feed | 1.4 | 2→4 |
| Reduction of Catalyst, Percent $V^{+4}$: | | |
| 1 day after start | 2.5 | 3.1 |
| 3 days after start | 2.6 | 3.7 |
| 21 days after start | 3.3 | |

*Example 9*

The effect of sulfur in the naphthalene feed was studied under similar operating conditions as set forth in Example 8 with the exceptions being noted in the following table:

| Experimental Condition | Percent Sulfur | Operating Time (days) | | |
|---|---|---|---|---|
| | | 0 | 8 | 25 |
| Optimum Temp. (° C.) | 0.0 | 355 | 355 | 355 |
| | 0.35 | 355 | 360 | 360 |
| | 1.55 | 355 | 370 | |
| Optimum PAA Yield, lbs./100 lbs. Refined N. | 0.0 | 107 | 107 | 107 |
| | 0.35 | 105 | 105 | 99 |
| | 1.55 | 105 | 99 | |
| Percentage Reduced Vanadium | 0.0 | 10 | 35 | 50 |
| | 0.35 | 10 | 50 | 60 |
| | 1.55 | 10 | 68 | |
| Mole Ratio $SO_3/K_2O$ in the catalyst | 0.0 | 1.87 | 1.87 | 1.92 |
| | 0.35 | 1.87 | 2.01 | 2.16 |
| | 0.35 | 1.98 | 2.10 | |
| | 1.55 | 1.98 | 2.27 | |

*Example 10*

The effect of sulfur compounds in the oxidation of anthracene to anthraquinone was studied as follows: The catalyst used contained about 42% by weight of a calcined gel of silica impregnated substantially uniformly with about 46–47% of potassium pyrosulfate ($K_2S_2O_7$), about 10% of a vanadium pentoxide and about 1% by weight of silver oxide, all percentages being based on the calcined weight of the catalyst. The anthracene had a sulfur content of approximately 0.2%. The operating conditions were as follows: The bed height of catalyst was 7 ft.; the gas velocity was 1 ft. per second; the contact time was 7 seconds; the inlet concentration of the anthracene in air was 1.25 mole percent; and the temperature was about 348° C.

The initial conversion of anthracene to anthraquinone was approximately 78 mole percent but, after continuing operations for approximately nine days, the conversion of anthracene to anthraquinone dropped to 71 mole percent.

A second run was made at a decreased temperature of about 338° C., at which temperature the conversion of anthracene to anthraquinone was 76 mole percent. After continuing operations for approximately 4 days, the conversion had dropped to only 70%.

A third run was made at an operating temperature of 348° C. using an anthracene feed having a sulfur content of less than 0.05%. The sulfur was removed by treatment in a sulfur removal bath by a treatment with 150% of the theoretically stoichiometrically required metallic sodium level for a period of time of about 45 minutes. The initial conversion of anthracene to anthraquinone was approximately 78 mole percent and this conversion was maintained constant at 78 mole percent for 14 days.

Although we have described but a few specific examples of our invention, we consider the case not to be limited thereby to the specific substances mentioned therein, but to include various other equivalent compounds of similar constitution as set forth in the claims appended hereto. It is understood that any suitable changes or variations may be made without departing from the spirit or scope of the inventive concept.

We claim:

1. A method for the vapor phase fluidized catalytic oxidation of naphthalene to phthalic anhydride which comprises pretreating naphthalene containing from about 0.1% to about 0.7% by weight of sulfur to reduce the sulfur content to less than about 0.1% by weight and then passing a mixture of the treated naphthalene and air at a temperature of from about 330° to about 425° C. through a fluidized catalyst comprising from about 40% to about 75% by weight of a calcined gel of silica impregnated with from about 20% to about 50% by weight of a potassium sulfate in which the molar ratio of $SO_3$ to $K_2O$ is from about 1.9:1 to 2.1:1 and from about 3% to about 25% of a vanadium oxide whereby said molar ratio of $SO_3$ to $K_2O$ is maintained in the catalyst during continued oxidation of the naphthalene to phthalic anhydride.

2. The method as defined in claim 1 wherein the sulfur content is reduced to from about 0.02% to about 0.06% by weight.

3. In a process for the vapor phase catalytic conversion of sulfur-containing aromatic hydrocarbons to intermediate oxidation products wherein aromatic hydrocarbon vapors in admixture with an oxidizing gas are passed at reaction temperatures of about 320°–425° C. and contact times of 3–25 seconds through a bed of finely divided fluidized catalyst containing a silica gel carrier supporting a mixture of vanadium oxides and a potassium sulfate in which the molar ratio of $SO_3$ to $K_2O$ is from about 1.9:1 to 2.1:1 the improvement which comprises maintaining said molar ratio of $SO_3$ to $K_2O$ in the catalyst by desulfurizing said sulfur-containing hydrocarbons to a sulfur content less than 0.1% prior to their contact therewith and thereby avoiding loss of catalyst activity during long-continued operation of the process.

4. In a process for the manufacture of phthalic anhydride from sulfur-containing naphthalene wherein a mixture of naphthalene vapor and an oxidizing gas is passed at reaction temperatures of about 320°–425° C. and contact times of 3–25 seconds through a bed of finely divided fluidized catalyst comprising about 40% to 75% by weight of a calcined gel of silica impregnated with from about 3% to 25% of vanadium oxide and about 20% to 50% of a potassium sulfate in which the molar ratio of $SO_3$ to $K_2O$ is from about 1.9:1 to 2.1:1 the improvement which comprises continuously maintaining said molar ratio of $SO_3$ to $K_2O$ in the catalyst by desulfurizing said sulfur-containing naphthalene to a sulfur content less than 0.1% prior to its contact therewith and thereby avoiding loss of catalyst activity during long-continued operation of the process.

5. A method according to claim 4 in which the naphthalene is desulfurized to a sulfur content of about 0.02% to 0.06% by weight.

References Cited in the file of this patent

UNITED STATES PATENTS

| | | |
|---|---|---|
| 1,692,126 | Jaeger | Nov. 20, 1928 |
| 1,889,945 | Brode | Dec. 6, 1932 |
| 2,013,973 | Scharff | Sept. 10, 1935 |
| 2,117,359 | Porter | May 17, 1938 |
| 2,626,236 | Tatterson | Jan. 20, 1953 |
| 2,698,330 | Fugate | Dec. 28, 1954 |
| 2,765,323 | Dixon | Oct. 2, 1956 |